US010160654B2

(12) United States Patent
Tian et al.

(10) Patent No.: US 10,160,654 B2
(45) Date of Patent: Dec. 25, 2018

(54) ULTRAHARD NANOTWINNED DIAMOND BULK MATERIAL AND METHOD FOR PREPARING THE SAME

(71) Applicant: Yanshan University, Qinhuangdao (CN)

(72) Inventors: Yongjun Tian, Qinhuangdao (CN); Quan Huang, Qinhuangdao (CN); Dongli Yu, Qinhuangdao (CN); Bo Xu, Qinhuangdao (CN); Julong He, Qinhuangdao (CN); Zhongyuan Liu, Qinhuangdao (CN); Wentao Hu, Qinhuangdao (CN); Zhisheng Zhao, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 681 days.

(21) Appl. No.: 14/540,836

(22) Filed: Nov. 13, 2014

(65) Prior Publication Data
US 2016/0137510 A1  May 19, 2016

(51) Int. Cl.
*C01B 32/25*   (2017.01)
(52) U.S. Cl.
CPC .................................. *C01B 32/25* (2017.08)
(58) Field of Classification Search
None
See application file for complete search history.

(56) References Cited

U.S. PATENT DOCUMENTS

| 2013/0081335 A1 | 4/2013 | Mazyar et al. |
| 2016/0137510 A1 | 5/2016 | Tian et al. |

FOREIGN PATENT DOCUMENTS

| CN | 1748862 | 3/2006 |
| CN | 101723358 | 6/2010 |

(Continued)

OTHER PUBLICATIONS

Ledbetter et al.; Observation of Higher Stiffness in Nanopolycrystal Diamond than Monocrystal Diamond; Nature Communications; Aug. 2013.*

(Continued)

*Primary Examiner* — Guinever S Gregorio
(74) *Attorney, Agent, or Firm* — Oblon, McClelland, Maier & Neustadt, L.L.P.

(57) ABSTRACT

The present invention relates to ultrahard nanotwinned diamond bulk materials and synthetic method thereof. In particular, the present invention discloses a diamond bulk material containing high density of nanocrystalline twins and synthetic method thereof, in which a nanotwinned diamond bulk is synthesized from particles of nanospherical onion-like carbon without diamond core (preferably with a size of 5-70 nm) as raw materials by using high temperature and high pressure synthesis. As compared with the prior art, the nanotwinned diamond bulk obtained according to the present invention has a much higher hardness than that of single crystal diamond and that of ultrahard polycrystalline diamond. The nanotwinned diamond bulk has wide prospects in various applications, including geological drilling, machining fields such as high speed cutting and precision and ultra-precision machining, abrasives, drawing dies, and special optics as well as other fields.

11 Claims, 8 Drawing Sheets
(6 of 8 Drawing Sheet(s) Filed in Color)

(56) References Cited

FOREIGN PATENT DOCUMENTS

| | | |
|---|---|---|
| CN | 102600876 | 7/2012 |
| CN | 102933490 | 2/2013 |
| CN | 103382025 A | 11/2013 |
| DE | 19624694 | 1/1998 |
| JP | 2000-109310 A | 4/2000 |
| KR | 20070111654 | 11/2007 |
| WO | WO 2010/104200 | 9/2010 |

OTHER PUBLICATIONS

Japanese Office Action dated Apr. 4, 2017 in Japanese Patent Application No. 2014-220632 (with English translation).

Quan Huang, et al., "Nanotwinned Diamond with Unprecedented Hardness and Stability", Nature, vol. 510, Jun. 12, 2014, pp. 250-253 with cover pages.

Florian Banhart, et al., "Self-Compression and Diamond Formation in Carbon Onions", Advanced Materials, vol. 9 No. 3, 1997, pp. 261-263 with cover pages.

Office Action dated Sep. 29, 2015 in Chinese Application No. 201310188507, filed May 20, 2013 (w/ English-language translation).

Natalia Dubrovinskaia, et al., "Superior Wear Resistance of Aggregated Diamond Nanorods", vol. 6, No. 4, pp. 824-826, Nano Letters, 2006.

Yongjun Tian, et al., "Ultrahard nanotwinned cubic boron nitride", vol. 493, pp. 385-388, Nature, Jan. 17, 2013.

Jesse Emspak, et al. "New Synthetic Diamonds are Hardest Gems Ever Created" Live Science Contributor; Jun. 19, 2014; pp. 1-5.

James Boland "Diamond gets harder" Nature.com/Nature; Jun. 12, 2014; vol. 510; No. 7504; 220-221.

K. Tanigaki, et al. "Observation of higher stiffness in nanopolycrystal diamond than monocrystal diamond" Nature; Aug. 12, 2013; 1-7.

P. Moller, et al. "Patagonian toothfish found off Greenland" Nature; vol. 421; Feb. 6, 2003.

H. Sumiya, et al. "Indentation hardness of nano-polycrystalline diamond prepared from graphite by direct conversion" Diamond; Apr. 27, 2004; 1771-1776.

H. Sumiya, et al. "Hardness and deformation microstructures of nano-polycrystalline diamonds synthesized from various carbons under high pressure and high temperature" J. Mater. Res.,; vol. 22; No. 8; Aug. 2007; 2345-4351.

* cited by examiner

ULTRAHARD NANOTWINNED DIAMOND BULK MATERIAL AND METHOD FOR PREPARING THE SAME

FIELD OF THE INVENTION

The present invention generally relates to ultrahard materials, particularly, to ultrahard nanotwinned diamond bulk material and its preparation method.

BACKGROUND OF THE INVENTION

Diamond is not only a glamorous jewelry, but also an irreplaceable ultrahard material useful in the industry due to its highest hardness among natural materials. Diamond is the hardest substance in the nature and well known as "king of the hardness". In addition to the ultrahardness, diamond also has excellent physical properties such as thermal sensitivity, thermal conductivity and semiconductivity, and thus has a wide range of applications including handicrafts, semiconductor appliances, geological drills, and cutting and grinding tools in the industry. However, due to anisotropy of the mechanical properties and presence of cleavage planes, there are some bottlenecks in practical applications of single crystal diamond and the scope of its applications is limited. To widen the scope of application of diamond in the industry, polycrystalline diamond and multi-crystal diamond have been synthesized.

Polycrystalline diamond can be produced by sintering natural diamond with binders. In particular, a mixture of diamond powders and binders (containing metals such as Co, Ni, and etc.) can be sintered at high temperature (e.g. 1,000-2,000° C.) and high pressure (e.g. 50,000-100,000 atm) to produce polycrystalline diamond. During the sintering, due to the addition of the binders, bridge bonds containing TiC, SiC, Fe, Co, Ni or the like as main components are formed among diamond crystals and the diamond crystals are embedded in the backbone of the bridge bonds via covalent bonds.

As compared with single crystal diamond, synthetic polycrystalline diamond has the following advantages: 1) it is isotropic and has a uniform hardness due to the disordered arrangement of crystalline grains; 2) it exhibits a higher strength, especially impact strength, allowing for a larger cutting capacity; 3) it can be made into a specific shape to adapt to different processing needs; 4) the performance of products made therefrom can be tailored to suit specific use purposes. Therefore, polycrystalline diamond is more suitable for the manufacture of cutting tools than single crystal diamond.

However, because of the presence of binders, such polycrystalline diamond has relatively low hardness (50-70 GPa) and poor thermal stability. Especially in case of that metal binders are used, when the temperature reaches 600-700° C., the diamond may be transformed into graphite under the catalytic action of metal ions, causing failure of the tool. To overcome the shortcoming brought by binders, in 2003, Japanese researchers Tetsuo Irifune et al. converted graphite directly into ultrahard multi-crystal diamond having a grain size of 10-200 nm at 12-25 GPa and 2,300-2,500° C. using ultra high pressure and high temperature (HPHT) technique ("Ultrahard polycrystalline diamond from graphite", *Nature*, 421, P599-600). Such multi-crystal diamond is a colorless and transparent block with a Knoop hardness of up to 140 GPa, which is higher than that of single crystal diamond (60-100 GPa), and is not anisotropic (i.e. the properties such as hardness in each direction are the same).

In 2006, German researchers Natalia Dubrovinskaia et al. converted $C_{60}$ directly into ultrahard multi-crystal diamond with a grain size of about 20 nm using HPHT at 20 GPa and 2,500 K ("Superior Wear Resistance of Aggregated Diamond Nanorods", *Nano Letters*, 2006, 6, P824-826). Such multi-crystal diamond has a Knoop hardness of up to 127 GPa and fracture toughness of up to $11.1\pm1.2$ MPa·m$^{0.5}$ which is 2-3 higher than that of single crystal diamond (3.4-5.0 MPa·m$^{0.5}$). Thus, size reduction of the crystalline grains seems to be an effective way to improve the performance of multi-crystal diamond.

Another type of synthetic diamond is diamond obtained using onion carbon as raw materials. Most of the onion carbon materials are obtained by high-temperature treatment of diamond nanopowders. For example, U.S. patent application Ser. No. 09/818,594 published on Jul. 29, 2003 under Publication No. U.S. Pat. No. 6,599,492B2 and V L Kuznetsov et al., "Onion-like carbon from ultra-disperse diamond", *Chemical Physics Letters*, 1994, 222, P343-348 describe in details the methods for preparation of onion carbon. There is usually a diamond core at the center of the onion carbon obtained by such methods. Onion carbon can be transformed into diamond under HPHT conditions. In 2009, Mingzhi Wang et al. transformed such onion carbon into polycrystalline diamond at 2-6 GPa and 1,000-1,600° C. (Chinese Patent Application No. 200910175257.X published on Jun. 9, 2010 under Publication No. CN101723358A). The onion carbon as employed has diamond core and the resulting polycrystalline diamond bulk has a grain size of less than 20 nm and Vickers hardness of 45-61 GPa, which is relatively low.

DESCRIPTION OF THE INVENTION

Although polycrystalline diamond and multi-crystal diamond have been synthesized, there is still a need in the industry for a synthetic diamond which has a higher hardness and/or better toughness and is suitable for a wider range of applications and the preparation method thereof.

The present disclosure provides an ultrahard nanotwinned diamond bulk material and the preparation method thereof.

The present invention is based on the following unexpected finding by the present inventors: the formation of nanotwinned structure appears to be a new way to enhance the hardness of ultrahard materials significantly. Based on this, the inventors has used particles of onion carbon free of diamond core, instead of the conventionally-used graphite, as raw materials, and converted the onion carbon free of diamond core into diamond under HPHT conditions, during which a large number of twins are produced, thus inhibiting grain growth and obtaining cubic diamond containing high density of nanocrystalline twins. Such a nanotwinned cubic diamond has ultrahigh hardness which can be far higher than that of single crystal diamond and that of multi-crystal diamond known in the prior art. In contrast, if onion carbon having diamond core is used as raw materials to synthesize diamond under HPHT conditions according to the prior art, it is not possible to obtain cubic diamond materials containing high density of twins due to the growth of the diamond core present in the onion carbon.

Using onion carbon particles free of diamond core to prepare ultrahard cubic diamond bulk materials has not yet been reported. The synthesis of nanotwinned diamond bulk has not been reported either.

In one aspect, the present disclosure discloses a synthetic method for preparing a diamond bulk material, comprising the following steps:

(1) Pressing onion carbon without diamond core in a mold into a preform;
(2) Loading the preform into a mold for high pressure synthesis, and treating the preform under 4-35 GPa at 1,200-2,300° C. for a sufficient time; and
(3) Decompressing and cooling.

Onion-like structure, also called onion-like nested structure, is well known in crystallography and refers to a concentric-multilayered spherical structure of particles observed under transmission electron microscopy. Onion carbon (also known as "onion-like carbon" or "carbon onion") is a nanospherical carbon with onion-like structure and is a known material developed in recent years. The properties, characteristics and preparation method thereof are well-known for a skilled person in the art. A main preparation method of onion carbon is heating nanodiamond to a temperature of above 1400° C. and the onion carbon produced by such a method usually has diamond core at the center. See e.g. Zhijun Qiao et al., "Graphitization and microstructure transformation of nanodiamond to onion-like carbon" *Scripta Materialia*, 2006, 54, P225-229.

In contrast, however, the onion carbon employed in the present invention as the raw materials is onion carbon without diamond core at the center, i.e. onion carbon free of diamond core. Such onion carbon without diamond core can be prepared by e.g. the methods described in Chinese Patent Application No. 201310314469.8 which is incorporated herein by reference in its entirety.

Briefly, nanospherical carbon with onion-like structure used in the present invention is an approximately spherical-shaped nanoparticulate carbon material, characterized by its concentric layered structure resembling that of an onion, a uniform distribution of particle size that is usually in the range of 5-70 nm (preferably 10-50 nm), and the lack of diamond core at the center. Such materials can be prepared according to the methods disclosed in Chinese Patent Application No. 201310314469.8. For example, they can be prepared as follows: adding carbon black into alcohol to obtain a suspension; pouring the suspension into a flow mill to allow production of high-speed jet turbulence, ultrasonic wave and shock wave; and forming nanospherical carbon of onion-like structure after repeated pressing and deformation of the carbon black suspension. The onion carbon obtained in such a way has no diamond core at the center.

More specifically, the onion carbon without diamond core employed in the present invention can be prepared by the exemplary method below:
(1) Placing carbon black powders with a particle size of 30-100 nm, as raw materials, into alcohol (e.g. in analytical grade) to obtain 1-30 wt % suspension;
(2) Pouring the suspension into an ultra-fine atomizer (e.g. PEL-20 ultra-fine atomizer, manufactured by Langfang Nano Machinery Co., Ltd., Hebei Province, China, which is capable of producing a pressure up to 1500 kg/cm$^2$ (i.e. 150 MPa) in the suspension) and subjecting it to repeated circulation under 100-150 MPa for 50-1000 times;
(3) Placing the product solution into a drying oven and treating it under ambient atmosphere at 45-60° C. for 3-6 hours, and then grinding the dried product into powders, resulting in nanoscale onion-like carbon with a particle size of 5-50 nm.

Figure 1A:
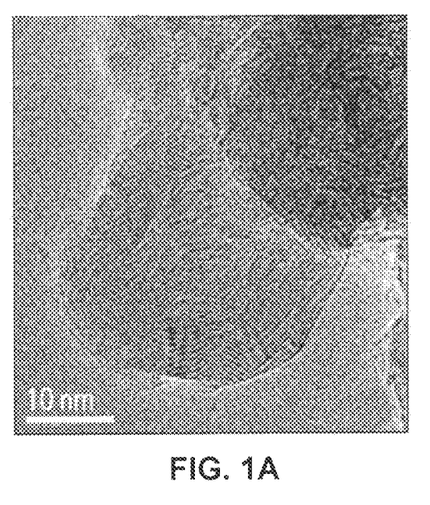
FIG. 1A shows a TEM image of onion carbon without diamond core employed as raw materials in the present invention.
Figure 1B:
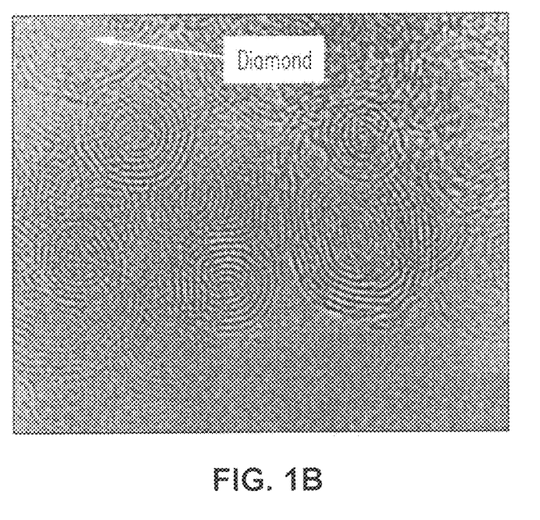
FIG. 1B shows a TEM image of onion carbon with diamond core obtained by heat treatment of nanodiamond (from V L Kuznetsov et al., "Onion-like carbon from ultra-disperse diamond", *Chemical Physics Letters*, 1994, 222, P343-348) as comparison.

FIG. 1A shows an electron microscopy image of exemplary particles of onion carbon without diamond core. In contrast, FIG. 1B shows an electron microscopy image of onion carbon with diamond core for comparison.

As raw materials employed in the present invention, the nanoparticles of onion carbon without diamond core preferably have particle sizes of 5-70 nm, preferably 5-50 nm, and more preferably 10-50 nm. To be used as reaction raw materials, the onion carbon usually needs to have purity not less than 90%, preferably not less than 95%, and more preferably not less than 98%.

According to the method of the present invention, the onion carbon powders need to be pressed into a preform, preferably in an inert atmosphere, e.g. in a glove box under nitrogen protection, before the HPHT synthesis step.

In the HPHT synthesis, the second step of the method of the present invention, the temperature as employed is usually in the rage of 1,200-2,300° C., such as from 1,200° C., 1,300° C., 1,400° C., 1,500° C. or 1,600° C. to 1,700° C., 1,800° C., 1,900° C., 2,000° C., 2,200° C. or 2,300° C., and can also be for example 1,800-2,300° C.; the pressure as employed is usually in the rage of 4-35 GPa, preferably 4-25 GPa, such as from 4, 5, 6, 7, 8, 9, 10, 11 or 12 GPa to 13, 14, 15, 16, 17, 18, 19, 20, 21, 22, 23, 24, 25, 26, 27, 28, 29, 30, 31, 32, 33, 34 or 35 GPa. The reaction time is generally less critical, and may be for example, 1-600 min, 1-240 min, 1-120 min, 2-120 min, 10-120 min, etc., which can be adjusted depending on the employed temperature and pressure.

Apparatuses for HPHT synthesis of diamond are well known to those skilled in the art. The method of the present invention can be carried out in such known apparatuses, such as T25 System, a 1000-ton in-situ HPHT synthesis and test system, available from Rockland Research Corporation, 16 Tompkins Avenue, West Nyack, N.Y. 10994, U.S.

Figure 2:
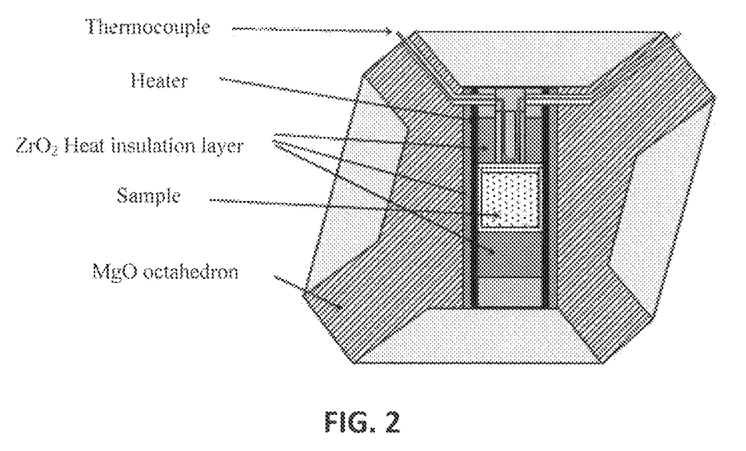
FIG. 2 shows a schematic diagram of HPHT assembly block as used in the present invention in a longitudinal sectional view.

During the HPHT synthesis, the preform of raw materials is inserted into an HPHT assembly, and then the HPHT assembly containing the preform is loaded into an HPHT apparatus. A schematic diagram of one exemplary HPHT assembly is shown in FIG. 2. Briefly, the protocol is using ceramic powders such as MgO to fabricate a block (an octahedron in T25 system) with a central cavity, placing a sample, heating unit, and temperature measuring unit into this cavity, and realizing pressure transmission sealing, and thermal insulation required by the synthesis through compressing densification of the MgO block. The HPHT assemblies used in the examples of the present invention were manufactured by Arizona State University, U.S. and purchased from TJ Pegasus Company, U.S., and two kinds of HPHT assemblies (specification: 10/5 and 8/3) were used during the HPHT synthesis.

Under the HPHT conditions of the second step, onion carbon without diamond core will be converted into cubic diamond crystals. As described above, because onion carbon without diamond core is used as the raw materials in the present invention, the onion carbon with layered spherical crystal faces, when transformed into cubic phase, will form a large number of twins preventing the grain growth, resulting in the formation of smaller grain size than that of known methods, and thus a substantial improvement of the performance of the resulting product.

Following HPHT synthesis, a cubic diamond bulk with nanocrystalline twins can be obtained after a decompressing step and cooling step, which is an ultrahard nanotwinned polycrystalline cubic (or composite) diamond bulk material. The term "diamond bulk" or "bulk material" as used herein is intended to mean that the method of the present invention can produce a block of diamond with a relatively large volume, e.g. in the range of 1-2,000 mm$^3$ or preferably 5-1,000 mm$^3$, instead of powders or microparticles of diamond. The diamond bulk material as obtained has one or more of the following characteristics/properties:

1) The Vickers hardness of the nanotwinned diamond bulk can reach 155-350 GPa; such as from 155, 160, 165, 170, 175, 180, 190, or 200 GPa to 280, 290, 300, 310, 320, 330, 340 or 350 GPa; Knoop hardness can reach 120-240 GPa; for example from 120, 125, 130, 135 or 140 GPa to 200, 210, 220, 225, 230, 235 or 240 GPa.

2) The fracture toughness ($K_{1C}$) of the nanotwinned diamond bulk is 10-30 MPa·m$^{1/2}$; such as 17-22 MPa·m$^{1/2}$ or 18-21 MPa·m$^{1/2}$;

3) The grain size of the nanotwinned diamond bulk is 2-100 nm, such as from 2, 4, 5, 6, 8, 10, 12, 15, 18, or 20 nm to 65, 70, 75, 80, 85, 90 or 95 nm;

4) The crystalline grains comprise high density of twins, with a twin thickness of 1-15 nm;

5) The nanotwinned diamond bulk is a colorless and transparent crystal, or black and nontransparent crystal; and 6) The volume of the nanotwinned diamond bulk can be 1-2,000 mm$^3$; such as 1-1,500 mm$^3$, 2-1,500 mm$^3$, 2-1,000 mm$^3$, 5-1,500 mm$^3$, 5-800 mm$^3$, 10-500 mm$^3$, or 10-200 mm$^3$.

In another aspect, the present disclosure further provides a diamond bulk material with ultrahigh hardness, which has an internal nanocrystalline cubic structure containing high density of twins inside its grains (i.e. nanotwinned diamond), and which has a grain size of 2-100 nm, Vickers hardness of 155-350 GPa and Knoop hardness of 140-240 GPa.

The structure of the ultrahard nanotwinned diamond bulk materials according to the present invention is believed to be a single phase of pure cubic sphalerite, or a composite phase consisting of cubic sphalerite and small amount of 6H-diamond, with a large number of twins comprised inside the grains and a twin spacing of 1-15 nm.

Compared with the prior art, the nanotwinned diamond bulks obtained according to the present invention have much higher hardness than that of traditional cubic diamond single crystals. The highest Vickers hardness is up to 350 GPa, which is more than 3 times higher than the hardness of single crystal diamond; and the highest Knoop hardness is up to 240 GPa. The nanotwinned diamond bulks have wide prospects in various applications, such as precision and ultra-precision machining, cutting tools, abrasives, drawing dies, and special optics, etc.

Besides the high hardness, the present invention also has one or more of the following prominent features and advantageous effects:

1) The process of the present invention is simple, without the need of special treatment of reaction raw materials, and the synthesis parameters are easy to control;

2) Bulk materials can be prepared using HPHT synthesis, and the density of the materials is high;

3) The nanotwinned cubic (or composite) diamond bulks have a relatively large volume in the range of 1-2,000 m$^3$;

4) The fracture toughness ($K_{1C}$) of the nanotwinned diamond bulk materials is 10-30 MPa·m$^{1/2}$ (for example 17-22 MPa·m$^{1/2}$);

5) The grain size of the nanotwinned diamond may be 5-100 nm; and

6) The nanotwinned diamond bulks are colorless and transparent crystals, or black and opaque crystals.

BRIEF DESCRIPTION OF THE FIGURES

The following drawings form part of the present specification and are included to further demonstrate certain aspects of the examples disclosed herein. The disclosure may be better understood by reference to one or more of these drawings in combination with the detailed description of specific embodiments presented herein. The patent or application file contains at least one drawing executed in color. Copies of this patent or patent application publication with color drawing(s) will be provided by the Office upon request and payment of the necessary fee.

EXAMPLES

Preparation of Raw Materials

The onion carbon without diamond core employed in the present invention can be prepared for example by the method as described in the Example 1 of Chinese Patent Application No. 201310314469.8, which is excerpted as follows:

(1) Weigh 3 g carbon black and mix them with 300 ml alcohol (of analytical grade) to give a suspension (1.27 wt %);

(2) Pour the resulted suspension into PEL-20 ultra-fine atomizer, and subject the suspension to repeated circulation in the atomizer under 150 MPa for 400 times, giving a product solution;

(3) Place the product solution into a drying oven and treat it under ambient atmosphere at 50° C. for 4 hours for drying, and then grind the dried product into powders and collect the powders, resulting in nanoscale onion carbon without diamond core. A TEM image of the obtained onion carbon is shown in FIG. 1A. The product can be seen to have a closed and curved, or not fully closed and curved onion-like structure The above method was repeated for several times so as to produce a sufficient amount of onion carbon without diamond core for preparation of the diamond bulk materials mentioned in the below examples.

HPHT Apparatus

T25 HPHT system, from Rockland Research Corporation, was used.

The HPHT assembly block as used is schematically shown in FIG. 2.

Test Methods

X-ray diffraction (XRD): D8 ADVANCE, from Bruker, Germany, operated at X-ray wavelength of 0.154 nm (Cu $K_\alpha$) and scanning speed of 0.2 degree/min.

Electron microscopy measurements: JEM-2010, JEOL, Japan, operated at an accelerating voltage of 200 KV.

Microhardness tests: KB-5 BVZ, from KB Prüftechnik GmbH, Germany is used. The angle between the opposing indenter faces for Vickers micro hardness test is 136° 30'; the indenter for Knoop microhardness test has angles 170° 30' and 130°. The hardness of a material is usually variable within a certain range of pressure load. Especially in case of ultrahard materials, because the material has a relatively high rigidity and the elastic strain of the indentation under a small load is relatively large, the measurement value of hardness tends to be higher than the actual value. For this reason, the hardness of such materials tends to be a constant value only when the load is greater than a critical value. Therefore, the hardness of the novel ultrahard materials of the present invention should be determined by varying the load until the measured hardness reaches an asymptotic value independent of the applied loads. The hardness measurements for all samples were performed by varying the load so as to obtain the real hardness value of the materials.

Depending on different shapes of diamond indenters, microhardness can be divided into Vickers microhardness and Knoop microhardness. For Vickers microhardness, diamond pyramid indenter with angle between opposing faces of 136° 30' is employed and the value is calculated by $H_V=1854.4 \cdot P/d^2$ (Hv: Vickers Hardness, GPa: P-load, N: d-diagonal of indentation, um). For Knoop microhardness, diamond pyramid indenter having rhombic base with included angles of 172° 30' and 130° is employed and the value is calculated by $H_K=14228.9 \cdot P/L^2$ (Hk: Knoop Hardness, GPa: P-load, N: d-diagonal of indentation, um). Compared with Vickers hardness, the indentation for Knoop hardness is not easy to crush; and under the same pressure load, the diagonal of indentation for Knoop hardness is usually longer, resulting in less measurement error.

For a better understanding of the invention, the present invention will be further described in details with the following examples, but not limited thereto.

Example 1: Preparation of Nanotwinned Diamond Bulk-1

(1) Preparation of raw materials for HPHT: Powders of onion-like carbon (with particle sizes of 5-30 nm) were placed into a glove box under nitrogen protection, and compressed into a block with a diameter of 1.6 mm and length of 3 mm, which was then sealed in a crucible made of refractory metal Re for subsequent use.

Figure 3:
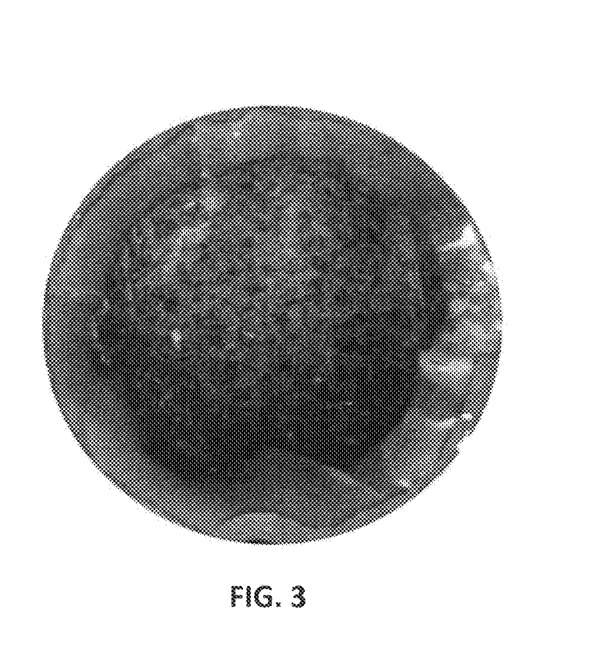
FIG. 3 shows a nanotwinned diamond bulk which is HPHT synthesized at 15 GPa and 1850° C.

(2) HPHT synthesis: The pre-compressed block described above was placed into a crucible of hexagonal boron nitride, which was then loaded into an HPHT assembly block (as described in FIG. 2). The HPHT assembly block was then loaded into T25 HPHT synthesis equipment (or a cubic HPHT synthesis equipment), and heated for 30 min under 15 GPa at 1850° C. A nanotwinned diamond bulk, as shown in FIG. 3, was obtained, with a density of 3.5±0.1 g/cm³.

Figure 4:
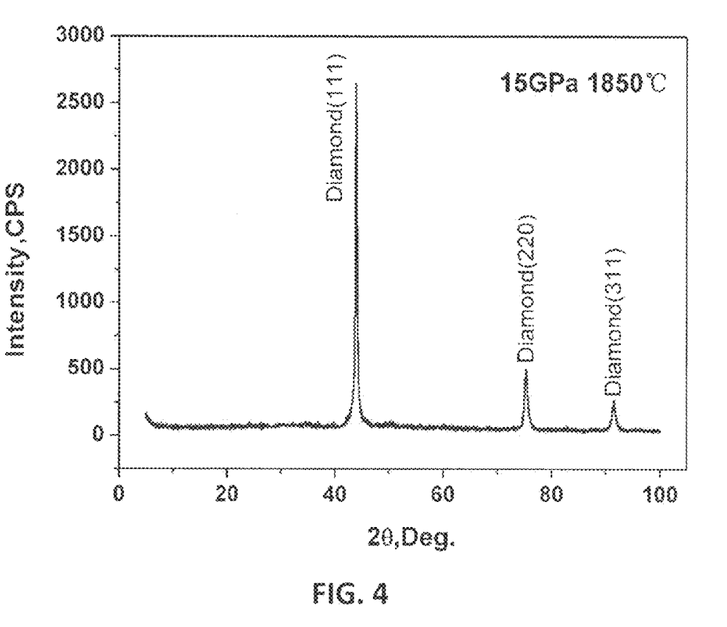
FIG. 4 shows X-ray diffraction pattern of the nanotwinned diamond bulk synthesized at 15 GPa and 1850° C.
Figure 5:
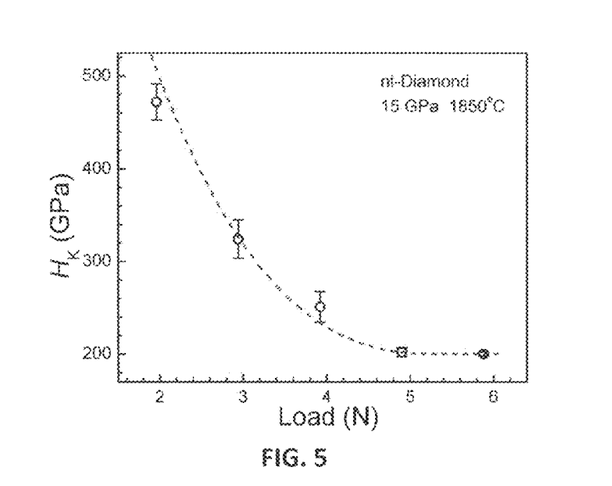
FIG. 5 shows Knoop microhardness of the nanotwinned diamond bulk synthesized at 15 GPa and 1850° C.
Figure 6:
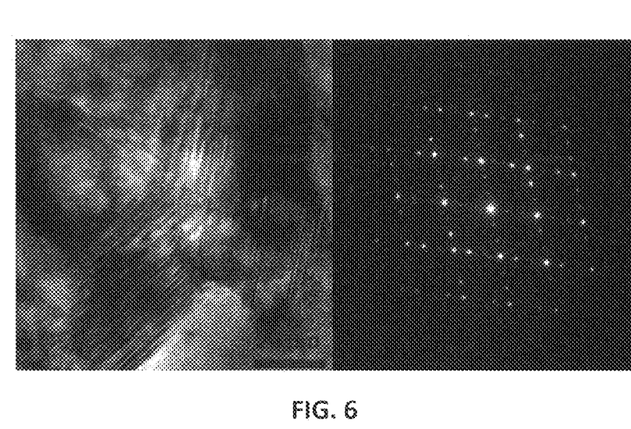
FIG. 6 shows a high resolution electron microscopy image of the nanotwinned diamond bulk synthesized at 15 GPa and 1850° C.
Figure 7:
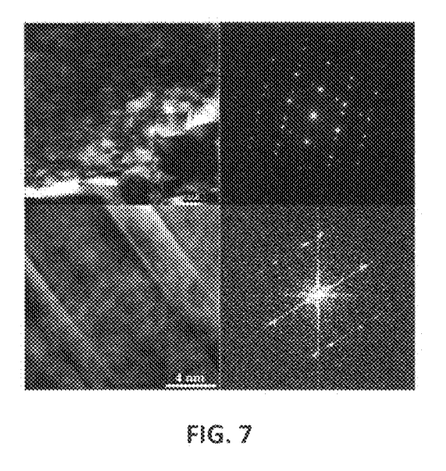
FIG. 7 shows twins of the nanotwinned diamond bulk synthesized at 15 GPa and 1850° C.

(3) Performance of the nanotwinned diamond bulk: XRD pattern of the prepared nanotwinned diamond bulk is shown in FIG. 4, indicating a pure cubic diamond phase. The hardness measured using KB-5 BVZ microhardness tester is shown in FIG. 5, with a Knoop microhardness value of 200±8 GPa. The results of high resolution TEM analysis are shown in FIG. 6, revealing an average grain size consistent with XRD. In the lattice-resolved image, a large number of {111} twins are clearly observed inside the grains (as shown FIG. 7), wherein A, B and C denote the twin boundaries. Twin thickness is about 2-10 nm with a twin density of about 20-30% inside the grains based on massive observations.

Example 2: Preparation of Nanotwinned Diamond Bulk-2

(1) Preparation of raw materials for HPHT: Powders of onion-like carbon (with particle sizes of 5-30 nm) were placed into a glove box under nitrogen protection, and compressed in situ into a block with a diameter of 1.6 mm and length of 3 mm, which was then sealed in a crucible made of refractory metal Re for subsequent use.

Figure 8:
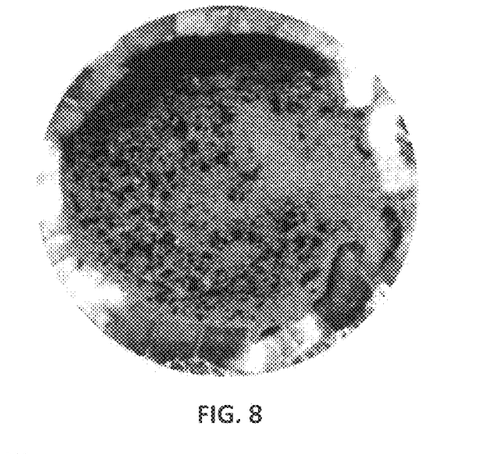
FIG. 8 shows a nanotwinned diamond bulk synthesized at 15 GPa and 2000° C.

(2) HPHT synthesis: The pre-compressed block described above was placed into a crucible of hexagonal boron nitride and then into an HPHT assembly block. The HPHT assembly block was then loaded into T25 HPHT synthesis equipment (or a cubic HPHT synthesis equipment), and heated for 30 min under 15 GPa at 2000° C. A nanotwinned diamond bulk, as shown in FIG. 8, was obtained.

Figure 9:
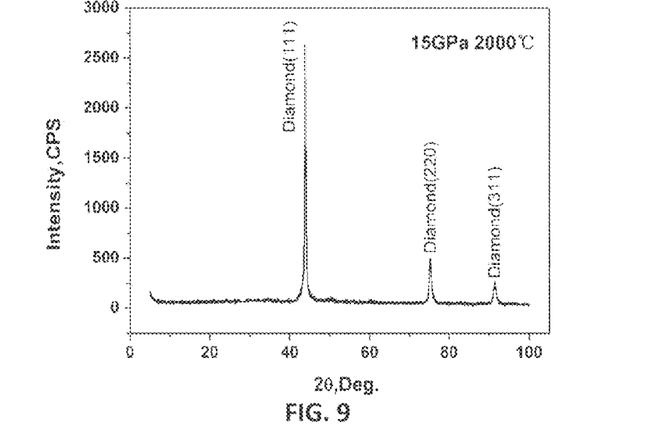
FIG. 9 shows X-ray diffraction pattern of the nanotwinned diamond bulk synthesized at 15 GPa and 2000° C.
Figure 10:
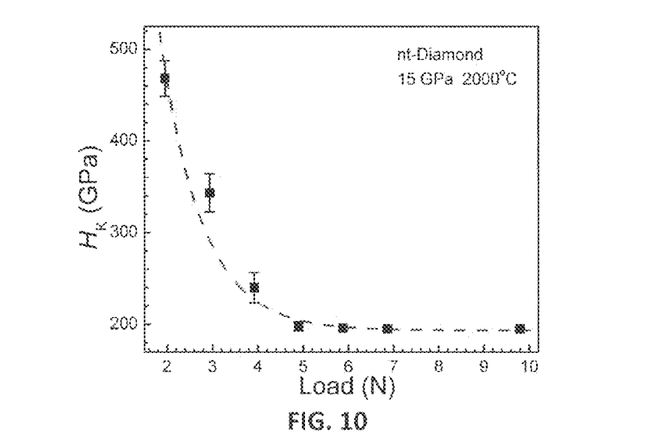
FIG. 10 shows Knoop microhardness of the nanotwinned diamond bulk synthesized at 15 GPa and 2000° C.

(3) Performance of the nanotwinned diamond bulk: XRD pattern (XRD) of the prepared nanotwinned diamond bulk is shown in FIG. 9, indicating a pure cubic diamond phase. The average grain size calculated from XRD is 10 nm. The measured Knoop microhardness is shown in FIG. 10, with a value of 198±5 GPa.

Example 3: Preparation of Nanotwinned Diamond Bulk-3

(1) Preparation of raw materials for HPHT: Powders of onion-like carbon (with particle sizes of 5-30 nm) were placed into a glove box under nitrogen protection, and compressed in situ into a block with a diameter of 1.6 mm and length of 3 mm, which was then sealed in a crucible made of refractory metal Re for subsequent use.

Figure 11:
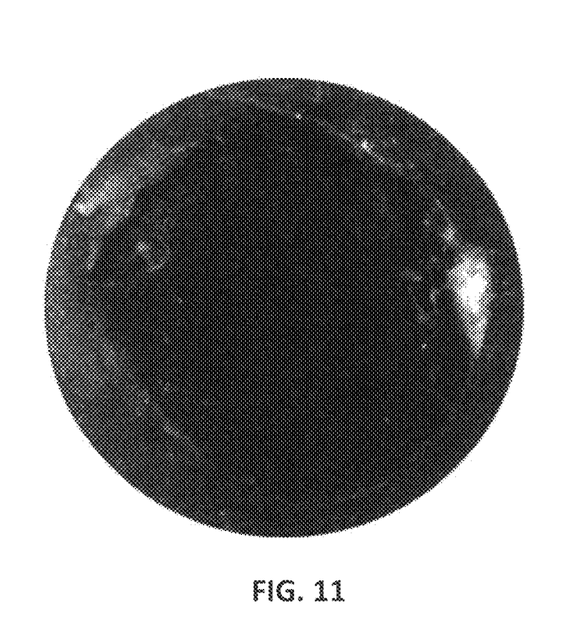
FIG. 11 shows a nanotwinned diamond bulk synthesized at 12 GPa and 1850° C.

(2) HPHT synthesis: The pre-compressed block described above was placed into a crucible of hexagonal boron nitride, which was then loaded into an HPHT assembly block. The HPHT assembly block was then loaded into T25 HPHT synthesis equipment (or a cubic HPHT synthesis equipment), and heated for 30 min under 12 GPa at 1850° C. A nanotwinned diamond bulk, as shown in FIG. 11, was obtained.

Figure 12:
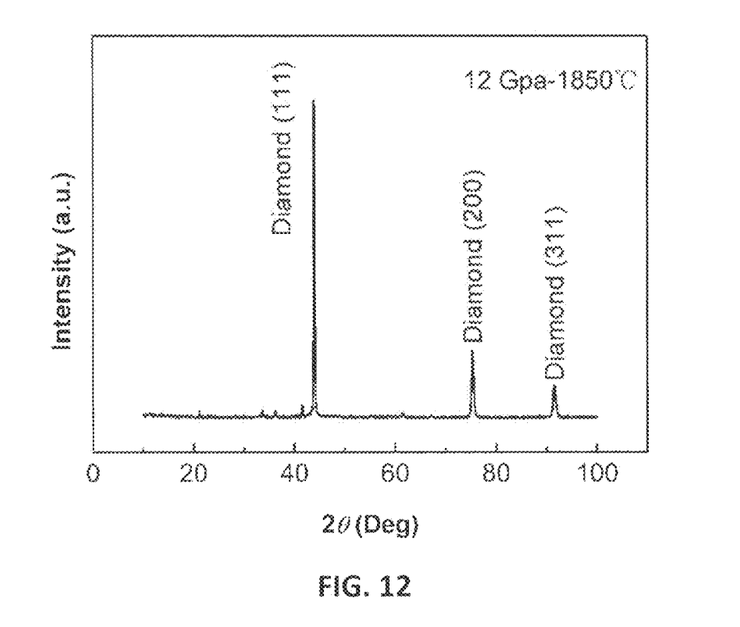
FIG. 12 shows X-ray diffraction pattern of the nanotwinned diamond bulk synthesized at 12 GPa and 1850° C.
Figure 13:
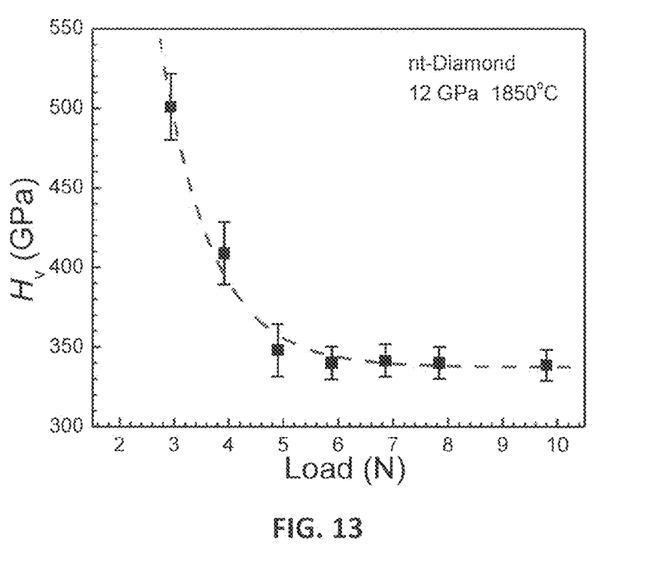
FIG. 13 shows Vickers microhardness of the nanotwinned diamond bulk synthesized at 12 GPa and 1850° C.

(3) Performance of the nanotwinned diamond bulk: XRD pattern (XRD) of the prepared nanotwinned diamond bulk is shown in FIG. 12, indicating a pure cubic diamond phase. The average grain size calculated from XRD is 8 nm. The measured Vickers microhardness is shown in FIG. 13, with a value of 330±6 GPa.

Example 4: Preparation of Nanotwinned Diamond Bulk-4

(1) Preparation of HPHT preform: Powders of onion-like carbon (with particle size of 5-30 nm) were placed into a glove box under nitrogen protection, and cold compressed into 12 pre-compressed blocks with a diameter of 2-3 mm and a length of 3-5 mm, which were then sealed in a crucible made of refractory metal Re in the glove box for subsequent use.

(2) HPHT synthesis: The pre-compressed blocks described above were placed into a crucible of hexagonal boron nitride and then into an HPHT assembly block. Subsequently, the HPHT assembly block was loaded into T25 HPHT synthesis equipment (or a cubic HPHT synthesis equipment), and heated for 10 min under 8-15 GPa and 1200-2000° C. Several nanotwinned diamond bulks were obtained.

Figure 14:
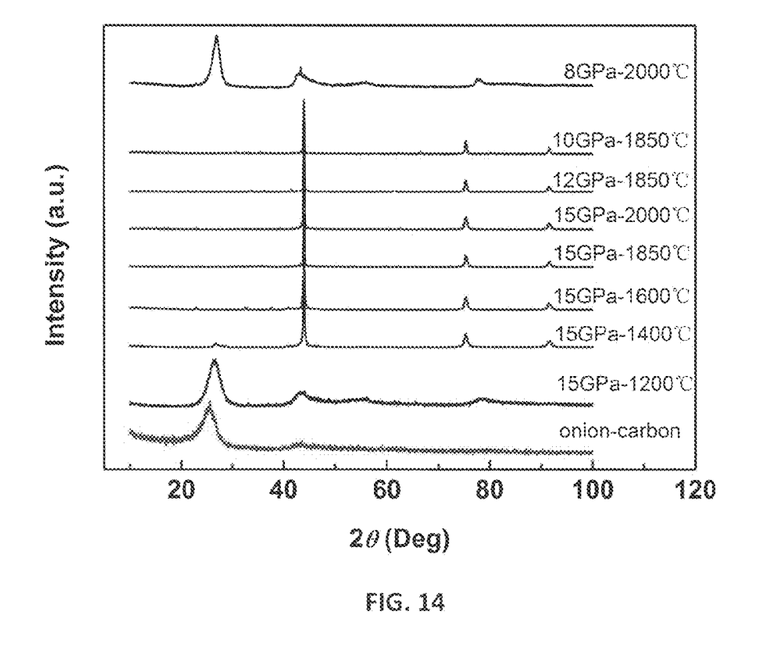
FIG. 14 shows X-ray diffraction pattern of the nanotwinned diamond bulks synthesized at 8-15 GPa and 1200-2000° C.
Figure 15:
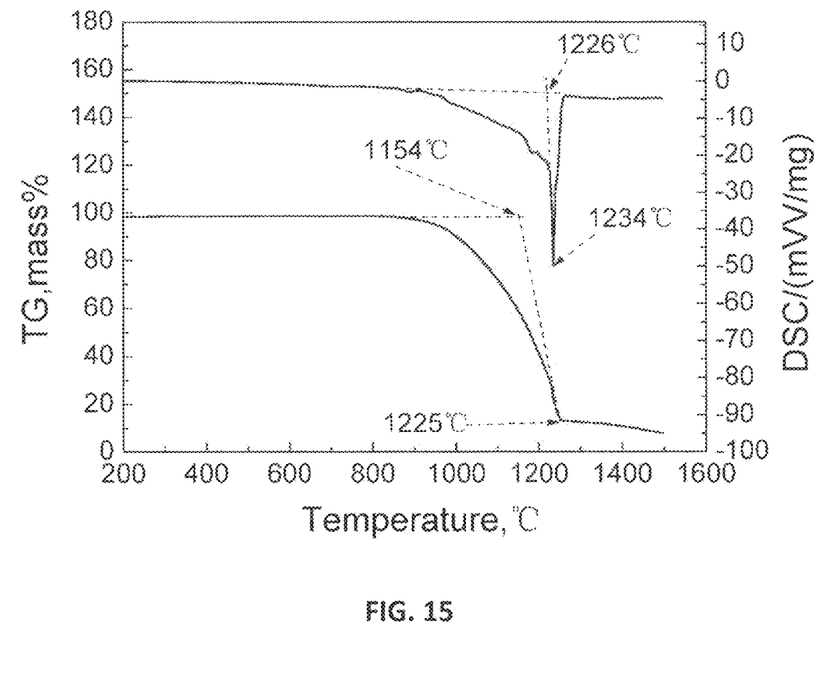
FIG. 15 shows thermal properties of the nanotwinned diamond bulk synthesized at 15 GPa and 1850° C.

(3) Performance of the nanotwinned diamond bulks: XRD patterns (XRD) of the prepared nanotwinned diamond bulks are shown in FIG. 14, showing that the products synthesized above 1600° C. are pure cubic phase of nanocrystalline diamond bulk, while the products synthesized below 1500° C. are diamond bulks with composite phases consisting of hexagonal structure (graphite) and cubic structure (diamond). The average grain sizes calculated from XRD are in the range of 5-40 nm. Results of thermal analysis are shown in FIG. 15, with a starting oxidation temperature of 1278° C. The fracture toughness ($K_{1C}$) of the obtained nanotwinned diamond bulks is in the range of 17-22 MPa·m$^{1/2}$.

The above only illustrates preferred embodiments of the present invention, but the scope of the invention is not limited thereto. Any modification or alternative which can be readily envisaged by a skilled person in the art according to the invention should fall within the scope of the present invention. Thus, the scope of the present invention should be determined by the appended claims.

Although candidate materials of the various components have been listed in the specification of the present invention, it should be understood that the above enumeration of component materials is neither restrictive nor exhaustive, and all of the various components can be replaced by other equivalent materials which are not mentioned in the present description, still achieving the purpose of the invention. Specific examples mentioned in the description also serve only for the purpose of explanation, instead of limiting the scope of the invention.

The terms "a," "an," "the" and similar referents used in the context of describing the present invention (especially in the context of the claims) are to be construed to cover both the singular and the plural, unless otherwise indicated herein or clearly contradicted by context.

Unless otherwise indicated, all numbers expressing quantities of ingredients, properties such as hardness, reaction conditions such as pressure or temperature, and so forth used in the specification and claims are to be understood as being modified in all instances by the term "about." Notwithstanding that the numerical ranges and parameters setting forth the broad scope of the invention are approximations, the numerical values set forth in the specific examples are reported as precisely as possible. Furthermore, the numerical ranges used in the specification include any combinations of any lower limits with any upper limits, and also include arbitrary ranges constituted of particular values mentioned in each specific example and any lower limits or upper limits mentioned in the specification. All these ranges obtained from such combinations fall within the scope of the invention, although these ranges are not explicitly listed in the specification. Similarly, each feature of the present invention mentioned in the specification can be combined with any other feature, as long as such a combination does not interfere deleteriously with this invention. All the embodiments as obtained from such combinations shall fall within the scope of the invention, although they are not specifically listed in the specification.

The invention claimed is:

1. A method for preparing a an ultrahard nanotwinned diamond bulk material, which has a grain size of 2-100 nm, Vickers hardness of 155-350 GPa and Knoop hardness of 140-240 GPa, and which has an internal nanocrystalline cubic structure possessing high density of twins inside its grains, comprising:
    (1) pressing onion carbon without diamond core in a mold into a preform;
    (2) loading the preform into a mold for high pressure synthesis, and treating the preform under about 4-35 GPa at about 1,200-2,300° C. for a sufficient time; and
    (3) decompressing and cooling.

2. The method according to claim 1, wherein the pressure employed in (2) is about 4-25 GPa.

3. The method according to claim 1, wherein (2) is performed for about 1-600 minutes.

4. The method according to claim 1, wherein the particle size of the particles of onion carbon without diamond core is 5-70 nm and the purity thereof is not less than 90%.

5. The method according to claim 1, wherein the prepared diamond bulk material has a volume of 1-2000 mm$^3$.

6. The method according to claim 1, wherein the prepared diamond bulk material is an ultrahard nanotwinned diamond bulk material.

7. The method according to claim 6, wherein the ultrahard nanotwinned diamond bulk material is a nanotwinned multi-crystal material comprising high density of twins inside its grains and having a twin thickness of 1-15 nm.

8. An ultrahard nanotwinned diamond bulk material, which has a grain size of 2-100 nm, Vickers hardness of 155-350 GPa and Knoop hardness of 140-240 GPa, and which has an internal nanocrystalline cubic structure possessing high density of twins inside its grains.

9. The ultrahard nanotwinned diamond bulk material according to claim 8, wherein the volume of the diamond bulk material is 1-2000 mm$^3$.

10. The ultrahard nanotwinned diamond bulk material according to claim 8, wherein the fracture toughness ($K_{1C}$) of the ultrahard nanotwinned diamond bulk material is 10-30 MPa·m$^{1/2}$.

11. The ultrahard nanotwinned diamond bulk material according to claim 8, wherein the Vickers hardness of the diamond bulk material is 160-340 GPa and the Knoop hardness of the diamond bulk material is 140-230 GPa.

* * * * *